United States Patent [19]

Sakai

[11] Patent Number: 4,674,072

[45] Date of Patent: Jun. 16, 1987

[54] INDEX PULSE GENERATOR CAPABLE OF PRODUCING AN INDEX PULSE OF STABILIZED NATURE FOR USE IN OPTICAL INFORMATION RECORDING AND REPRODUCTION SYSTEMS

[75] Inventor: Mitsugu Sakai, Hachioji, Japan

[73] Assignee: Olympus Optical Co., Ltd., Tokyo, Japan

[21] Appl. No.: 776,676

[22] Filed: Sep. 16, 1985

[30] Foreign Application Priority Data

Sep. 28, 1984 [JP] Japan .............................. 59-145906[U]

[51] Int. Cl.$^4$ .............................................. G11B 27/24
[52] U.S. Cl. ................................................... 369/52
[58] Field of Search ................... 360/72.1, 73; 369/50, 369/52, 275; 307/234, 358, 517, 518

[56] References Cited

U.S. PATENT DOCUMENTS 4,339,727 7/1982 Kaye et al. ........................ 307/358

FOREIGN PATENT DOCUMENTS 0054438 12/1981 European Pat. Off. .

OTHER PUBLICATIONS

IBM Technical Disclosure Bulletin, vol. 18, No. 7, Dec. 1975, *Voltage Source Direction Detector with Digital Output.*

Primary Examiner—Raymond F. Cardillo
Assistant Examiner—James E. Tomassini
Attorney, Agent, or Firm—Louis Weinstein

[57] ABSTRACT

An index pulse generator detects an index mark applied to a record medium. A signal detected in this manner is passed through a low pass filter to provide a reference signal, and the detected signal is compared against the reference signal to deliver an index pulse.

4 Claims, 11 Drawing Figures

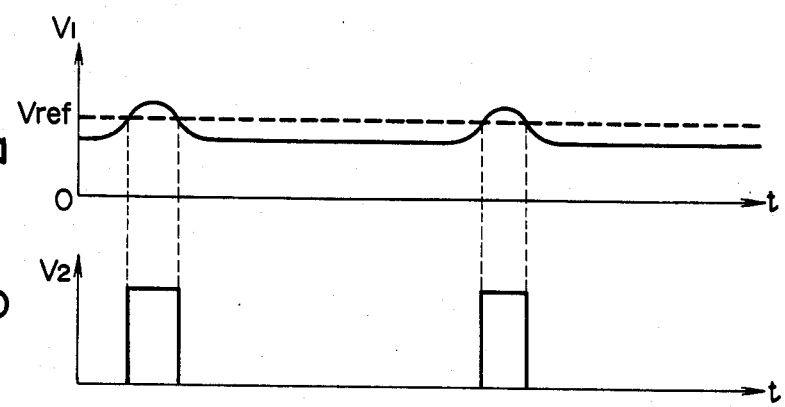
FIG. 3a PRIOR ART
FIG. 3b PRIOR ART
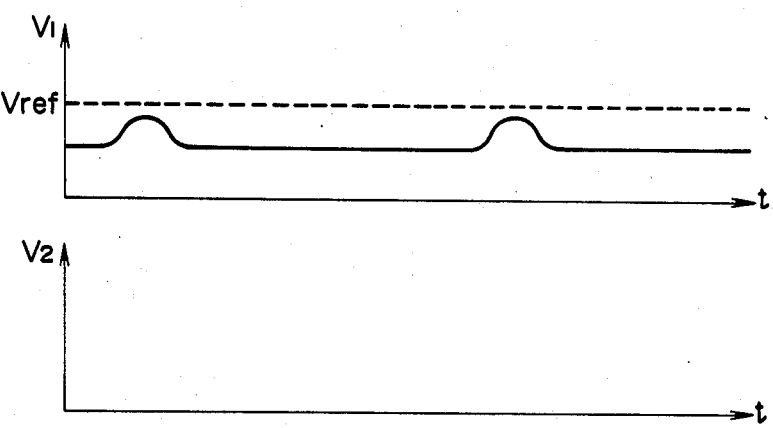
FIG. 4a PRIOR ART
FIG. 4b PRIOR ART

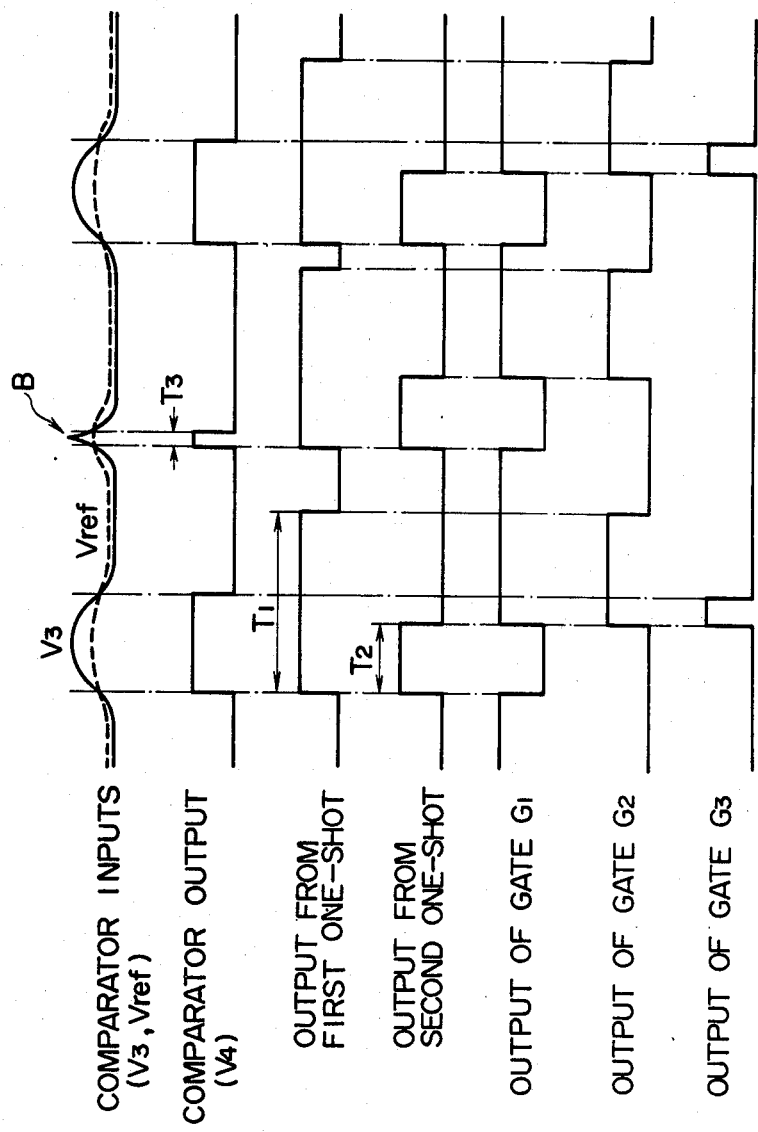

INDEX PULSE GENERATOR CAPABLE OF PRODUCING AN INDEX PULSE OF STABILIZED NATURE FOR USE IN OPTICAL INFORMATION RECORDING AND REPRODUCTION SYSTEMS

BACKGROUND OF THE INVENTION

The invention relates to an index pulse generator for optical information recording and reproduction systems, and more particularly, to an improvement of an index pulse generator which is used in an optical information recording and reproduction system such as is used in combination with an optical disc, optical magnetic disc or the like.

In optical information recording and reproduction systems, an index pulse is utilized in detecting the number of revolutions of the disc, detecting the presence or absence of a disc loaded, deriving a timing signal for the recording and reproduction of information, or deriving a track jump signal for a disc having spiral track information.

An index pulse generator of this kind has been constructed as illustrated in FIG. 1. Specifically, a disc 1 on which optical information is recorded or from which such information is reproduced is detachably mounted on an output shaft of a drive motor 3 by means of a clamp member 2. As shown in FIG. 2, the bottom surface of the disc 1 is partly formed with an index mark as may be formed by a light reflector 4 of aluminium or the like, in combination with a photoreflector 5 which is located so as to be aligned with the path of movement of such mark. The photoreflector 5 directs a light beam toward the light reflector 4, which then reflects the light beam, which is collected by the photoreflector to be converted into an electrical signal. A current signal which is outputted from the photoreflector 5, passes through a resistor R1, across which a voltage signal V1 is developed for application to a positive (i.e. non-inverting) input of a comparator 6. A reference voltage Vref of a given value from a source, not shown, is applied to the negative (i.e. inverting) input of the comparator 6. In this manner, the comparator 6 develops an index pulse V2 in response to the comparison.

When the disc 1 is rotated by the motor 3, the photoreflector 5 scans the disc along a path indicated by dotted lines A shown in FIG. 2. It will be understood that the light reflector 4, which may be formed of aluminium, presents an optical reflectivity of an increased magnitude while the remainder of the bottom surface of the disc 1 exhibits an optical reflectivity of a reduced magnitude. Accordingly, the photoreflector 5 outputs a signal V1 which is subject to a periodic variation as indicated by a solid line curve in FIG. 3(a). In other words, the signal V1 has an increased value only when the photoreflector 5 receives reflected light from the light reflector 4. It will be recognized that the signal V1 has a d.c. component which is attributable to dark current or the like.

If the slicing level of the reference voltage Vref is established as indicated by broken lines in FIG. 3(a), a comparison of the output voltage V1 against the reference voltage Vref in the comparator 6 results in an output pulse voltage V2 as shown in FIG. 3(b). In the prior art practice, the pulse voltage V2 is utilized as an index pulse in controlling data write/read operation.

However, it is generally difficult to establish a value of the reference voltage Vref, as indicated in FIG. 3(a). It will be understood that the amount of light reflected varies when the disc 1 undergoes undulation as when the disc 1 is changed, when the non-uniformity of the clamp member 2 results in a change in the distance between the disc 1 and the photoreflector 5, and when the reflectivity of the light reflector 4 varies with time. Accordingly, the waveform of the voltage signal V1 changes, and may not be crossed by the reference voltage Vref as illustrated in FIG. 4(a). Accordingly, the width of the index pulse may change, or such pulse may be completely removed as indicated in FIG. 4(b), thus preventing a proper control of data write/read operation.

SUMMARY OF THE INVENTION

The present invention has been made in order to overcome the above disadvantage, and has for its object the provision of an index pulse generator for optical information recording and reproduction systems which enables an index pulse of a stabilized nature to be produced in the presence of undulations in the disc or aging effect of an optical reflector, thus allowing a proper control of data write/read operation.

In accordance with the invention, an index pulse is obtained as a result of a comparison of a detection signal which is derived from an index mark applied to a record medium and a reference voltage which is produced by passing the detection signal through a low pass filter. This allows an index pulse having a stable pulse width to be obtained in the presence of undulations in the disc or the aging effect, thus allowing a proper control of data write/read operation in the optical information recording and reproduction system.

BRIEF DESCRIPTION OF THE DRAWINGS

FIGS. 3(a)-3(b) and 4(a)-4(b) graphically show voltage waveforms which are useful in describing the operation of the pulse generator shown in FIG. 1;

FIGS. 6(a)-6(c) and 7 graphically show a series of voltage waveforms and output waveforms illustrating the operation of the pulse generator shown in FIG. 5.

DESCRIPTION OF PREFERRED EMBODIMENT

Figure 1:
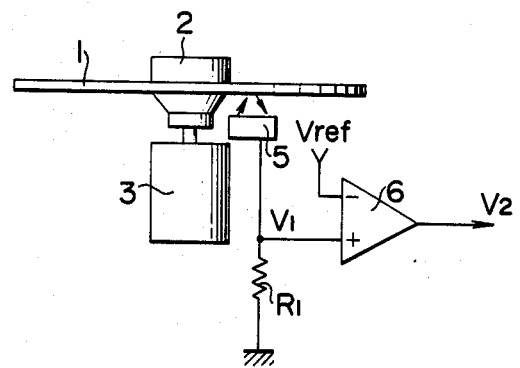
FIG. 1 is a schematic view of one form of index pulse generator of the prior art.
Figure 2:
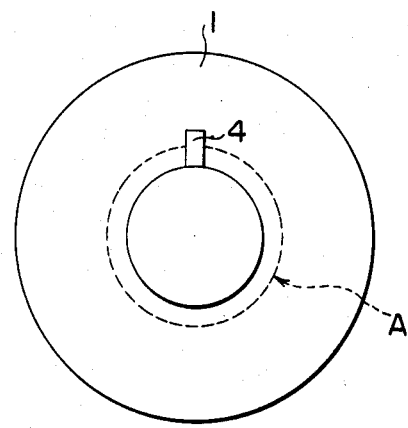
FIG. 2 is a bottom view of a disc.
Figure 5:
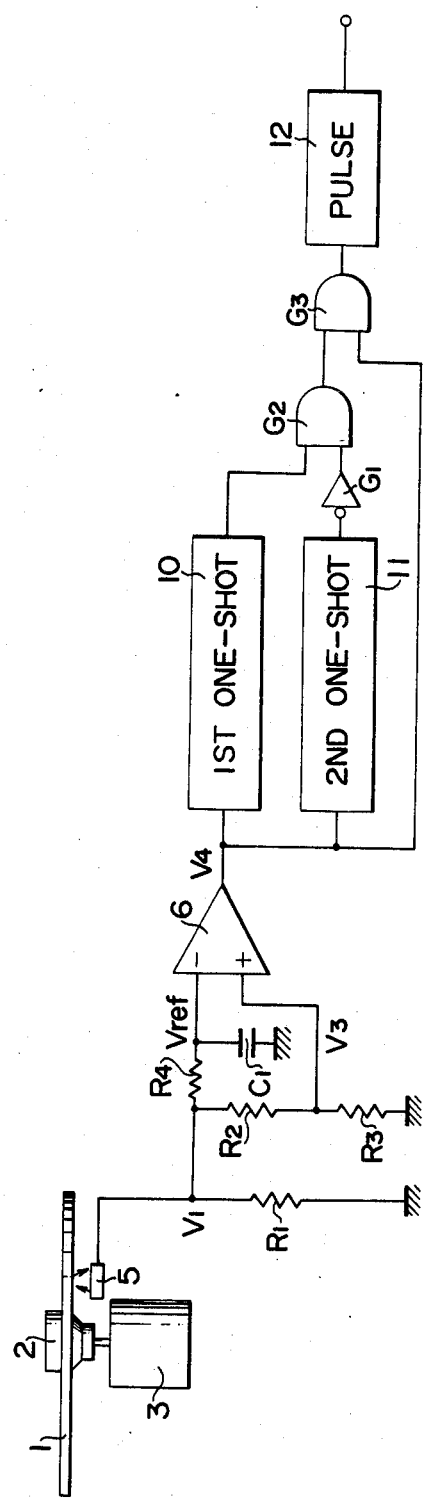
FIG. 5 is a circuit diagram and a schematic view of an index pulse generator according to one embodiment of the invention.

Referring to FIG. 5, the disc drive shown in similar to that shown in FIG. 1. Thus, the disc 1 is detachably mounted on the output shaft of the drive motor 3, by means of a clamp member 2, and the photoreflector 5 is positioned to read an index mark on the disc 1. An output voltage V1 from the photoreflector 5 is applied to a voltage divider comprising resistors R2 and R3. A voltage developed at the junction between these resistors is applied to the positive input of the comparator 6 as a pulse signal V3. In addition, the output voltage V1 is passed through a low pass filter including resistor R4 and capacitor C1 to be applied to the negative input of the comparator 6 as a reference voltage Vref. The comparator 6 compares the voltage V3 against the reference voltage Vref to develop an output V4.

The output V4 is applied to each of a pair of one-shot multivibrators or monostable multivibrators 10, 11, each of which produces a one-shot pulse having a given duration $T_1$ and $T_2$ (see FIG. 7), respectively. The output from the multivibrator 10 is directly applied to one input of an AND gate G2 while the output from the multivibrator 11 is applied to the other input of the gate 2 through an inverter G1. A logical sum of the voltage V4 and an output from the gate G2 is formed by a second AND gate G3. An output from the second AND gate G3 is applied to a pulse detector 12, which delivers an index pulse.

Figures 6A, 6B, 6C:
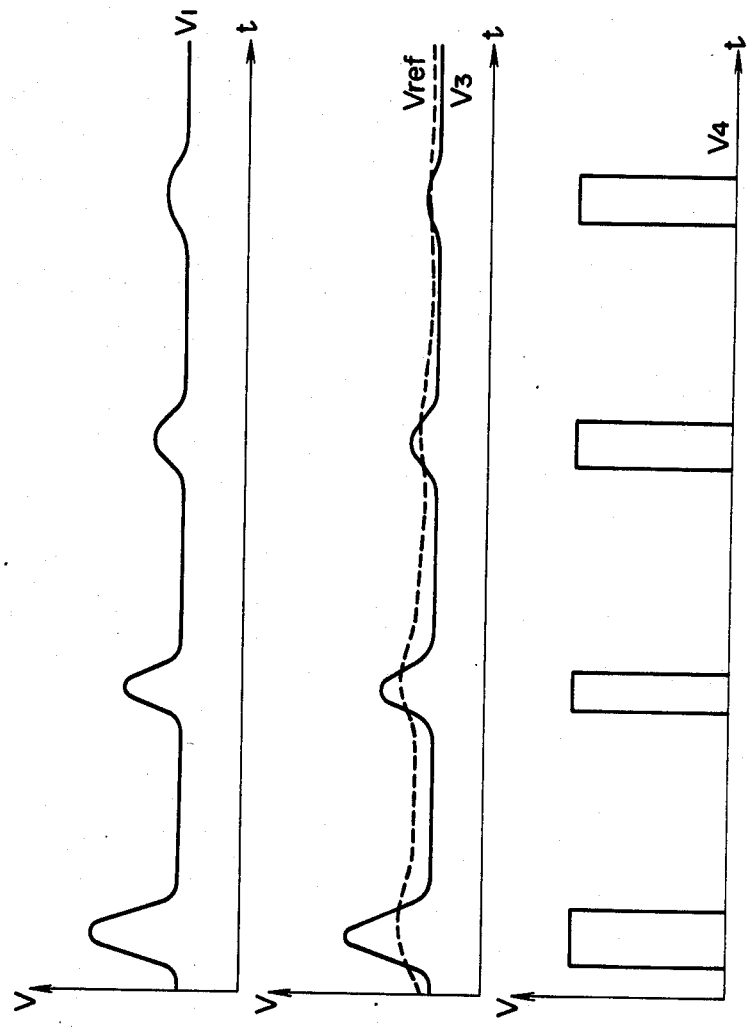

The operation of the embodiment shown in FIG. 5 will now be described with reference to the waveforms shown in FIGS. 6 and 7. FIG. 6 shows the waveforms of the voltages V1, V3, V4 and Vref shown in FIG. 5. The output signal V1 from the photoreflector 5 has a waveform on which peaks appear each time it detects the presence of the light reflector 4, whereby the voltage V3 which is input to the comparator 6 will be as shown by the solid-line waveform shown in FIG. 6(b). If the peaks on the output voltage V1 are of a nature which exhibits an attenuating response as shown, while the reference voltage Vref remains constant (as illustrated in FIG. 3) in the usual manner, the resulting index pulse will have a progressively decreasing pulse width, and eventually, the pulse itself will disappear.

However, in the embodiment shown in FIG. 5, the reference voltage Vref is defined by the voltage V1 after it has been passed through the low pass filter. Accordingly, it exhibits a waveform which varies with a variation in the voltages V1 and V3, as indicated in dotted lines in FIG. 6(b). By a suitable choice of the value of the resistor R4, etc., it is possible to provide pulses of a given duration for the output V4 from the comparator 6, as indicated by the output waveform of FIG. 6(c). In this manner, it is possible to provide index pulses having a stable duration or width in the presence of various factors which influence upon the magnitude of the output voltage V1 from the photoreflector 5.

FIG. 7 shows a series of waveforms which illustrate the operation of a spike noise elimination circuit connected to the output of the comparator 6. The spike noise elimination circuit eliminates the influence of spike noises which result from fluctuations in the power supply or the pressure of dust. The first one-shot multivibrator 10 is designed to deliver a one-shot pulse of a duration $T_1$ which is greater than the pulse width of the output V4 from the comparator 6 while the second one-shot multivibrator 11 is designed to deliver a one-shot pulse of a duration $T_2$ which is less than the pulse width of the output V4. By choosing the duration or pulse width of outputs from the both multivibrators 10, 11 in this manner, it is possible to suppress the occurrence of an output pulse in response to a spike noise B.

Specifically, the output V4 corresponding to the spike noise B will have a pulse width $T_3$ which is less than the pulse widths $T_1$ and $T_2$ of the one-shot multivibrators 10, 11, and hence cannot enable the second AND gate G3.

In the described embodiment, the index mark is provided in the form of a light reflector for detection so that the photoreflector delivers a high output when its presence is detected. However, it is also possible to provide an index mark in the form of a reduced optical reflectivity area, thereby allowing an index pulse to be detected. Also it is possible to implement a circuit which eliminates the influence of spike noises by the combination of a low pass filter and a comparator.

What is claimed is:

1. An index pulse generator for an optical information recording and reproducing system in which information is optically recorded or reproduced, comprising
   detector means for detecting an index mark applied to a record medium;
   a low pass filter through which an output from the detector means is passed to provide a reference signal;
   means for comparing an output signal from the detector means against the reference signal to deliver an index pulse; and
   a spike noise elimination circuit including a first and a second one-shot multivibrator each of which receives the index pulse, a first AND gate to which an output pulse from the first one-shot multivibrator is directly applied and an output pulse from the second one-shot multivibrator is applied through an inverter, and a second AND gate which receives an output from the first AND gate and the index pulse.

2. An index pulse generator according to claim 1 in which said first and second one-shot multivibrators each generate an output pulse responsive to the index pulse, said output pulses being of different pulse durations.

3. An index pulse generator according to claim 2 in which the output pulse generated by one of said first and second one-shot multivibrators persists for a time period sufficient to prevent spike pulses from being generated at the output of said second AND gate.

4. An index pulse generator according to claim 1 further including pulse generating means coupled to the output of said second AND gate for generating a pulse of a predetermined pulse width responsive to an output generated by said second AND gate.

* * * * *